United States Patent
Tennyson et al.

(10) Patent No.: US 6,798,866 B1
(45) Date of Patent: Sep. 28, 2004

(54) SYSTEM AND METHOD FOR VERIFYING CENTRAL OFFICE WIRING ASSOCIATED WITH LINE SHARING

(75) Inventors: Gary Tennyson, Alabaster, AL (US); Eric Ott Brockman, Hoover, AL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 272 days.

(21) Appl. No.: 10/012,460

(22) Filed: Dec. 12, 2001

(51) Int. Cl.[7] .......................... H04M 1/24; H04M 3/08; H04M 3/22

(52) U.S. Cl. .................. 379/1.03; 379/1.01; 379/1.04; 379/21; 379/22.01; 379/22.04; 379/24

(58) Field of Search .............................. 379/1.01, 1.03, 379/1.04, 21, 22, 22.01, 22.02, 22.03, 22.04, 22.06, 22.07, 24, 27.01, 27.02, 27.06, 27.07, 28, 29.01, 29.04, 29.05, 30; 370/241, 242, 247, 248, 249, 250, 251

(56) References Cited

U.S. PATENT DOCUMENTS

| | | | |
|---|---|---|---|
| 1,342,885 A | | 6/1920 | Armstrong |
| 3,708,634 A | | 1/1973 | Vantill et al. |
| 4,431,875 A | * | 2/1984 | Simokat .................. 379/27.01 |
| 5,510,927 A | | 4/1996 | Noe |
| 5,619,536 A | | 4/1997 | Gourgue |
| 5,754,624 A | | 5/1998 | Sullivan et al. |
| 5,857,011 A | | 1/1999 | Kennedy et al. |
| 5,956,385 A | * | 9/1999 | Soto et al. ................ 379/27.01 |
| 6,061,429 A | | 5/2000 | Clowez |
| 6,144,722 A | | 11/2000 | Anderson et al. |
| 6,252,942 B1 | | 6/2001 | Zoiss et al. |
| 6,259,902 B1 | | 7/2001 | Siomkos et al. |
| 6,282,265 B1 | * | 8/2001 | Lowell et al. ................. 379/25 |
| 6,330,306 B1 | * | 12/2001 | Brown ........................ 379/21 |
| 6,373,923 B1 | * | 4/2002 | Williamson et al. ..... 379/22.01 |
| 6,466,650 B1 | * | 10/2002 | Fischer et al. ........... 379/27.01 |
| 6,480,575 B2 | * | 11/2002 | Chea et al. ..................... 379/9 |
| 6,496,566 B1 | * | 12/2002 | Posthuma .................... 379/22 |
| 6,504,906 B1 | * | 1/2003 | Kiko ........................ 379/27.01 |
| 6,532,216 B1 | * | 3/2003 | Tennyson ................... 370/244 |
| 6,556,661 B1 | * | 4/2003 | Ingalsbe et al. ......... 379/22.04 |
| 6,574,309 B1 | * | 6/2003 | Chea et al. ..................... 379/9 |

OTHER PUBLICATIONS www.ezlink.com/~crash/parks/hetbasic.html, "How Does a Superheterodyne Radio Work?", Nov., 2001, pp. 1–6.

* cited by examiner

Primary Examiner—Quoc D. Tran
(74) Attorney, Agent, or Firm—Withers & Keys, LLC

(57) ABSTRACT

A system and method for verifying the integrity of a DSL circuit on a shared telephone line. The invention uses the amplitude modulation principles to overcome the difficulty associated with a blocking capacitor that isolates a DSLAM on the DSL circuit from the rest of the shared telephone line. A transmitter of the invention mixes a high frequency carrier signal and a low frequency audio signal to produce an amplitude-modulated test signal. The amplitude modulated signal is supplied to the telephone line at a main distributing frame side of the blocking capacitor and is detected by a receiver at the DSLAM side of the blocking capacitor.

26 Claims, 4 Drawing Sheets

SYSTEM AND METHOD FOR VERIFYING CENTRAL OFFICE WIRING ASSOCIATED WITH LINE SHARING

BACKGROUND

1. Field of the Invention

The present invention relates generally to test equipment, and more particularly to a system and method for verifying central office (CO) wiring associated with line sharing.

2. Background of the Invention

The Federal Communications Commission (FCC) has promulgated rules that require Incumbent Local Exchange Carriers (ILEC) to share certain telecommunications resources with Competitive Local Exchange Carriers (CLEC). One of these rules enables a CLEC to use telephone lines of an ILEC, in competition with the ILEC, to offer telecommunications services to customers of the ILEC. Such line sharing arrangement allows the CLEC to provide, for example, digital subscriber line (DSL) services over the same loop that is used by the ILEC for voice communications.

Without the line sharing arrangement, DSL services can be provided by the ILEC using a combined splitter and DSL modem (also known as a digital subscriber line access multiplexer or DSLAM) that are placed at a common location within a CO. Testing or verification of the wiring would not be a difficult task because both voice and data are provided by the ILEC. Under a line sharing arrangement, however, the CLEC's DSLAM is a different unit that is physically separated from the ILEC's splitter. Due to the competitive nature between the ILEC and the CLEC, the ILEC's splitter and the CLEC's DSLAM are physically located in different parts of a CO, even though each of the splitter and the DSLAM is ultimately connected to a common telephone line that serves the same customer. More often than not, the ILEC's splitter and the CLEC's DSLAM are located on separate floors in a building that houses the CO. Such physical separation of the splitter and the DSLAM creates unprecedented complexity associated with testing CO wiring. In some cases, for instance, five two-wire connections between wire terminals are required. This complexity, of course, increases the potential for wiring errors.

Portable telephone test sets are used extensively in the telecommunications industry to establish temporary communications or test lines for proper operation. These test sets are widely referred to as "butt sets." The term butt sets is used herein to refer to the portable telephone test sets. As known in the art, voice circuits can be "verified" or tested using the CO's embedded Automatic Number Announcement Circuit (ANAC). The verification process typically involves the following steps. First, a technician bridges across the circuit with a conventional butt set. Second, the technician causes the butt set to go off-hook to draw a dial tone. Third, the technician dials the ANAC number. Fourth, the ANAC responds with the telephone number of the telephone line being tested. Fifth, the telephone number provided by the ANAC is used by the technician to verify the line. Unfortunately, this method of verification cannot be used to verify the DSL circuit in a line sharing arrangement in which the splitter and the DSLAM are physically separated.

To minimize the possibility of faults on the DSL circuit affecting the voice circuit, the industry standard for line sharing requires a blocking capacitor in the splitter. As known in the art, the blocking capacitor prevents the flow of direct current, which signals the switch to provide dial tone. For this reason, the ANAC process described above cannot be used.

There are currently no known products on the market that are specifically designed to verify the DSL circuit under the line sharing arrangement. As a result, technicians of local exchange carriers must improvise a method to verify CO wiring associated with line sharing.

Technicians have attempted to verify the DSL circuit using frequencies higher than those in the voice band to overcome the blocking capacitor. This method is undesirable because it requires a transmitter and a specially made receiver that is adapted to detect high frequencies. A conventional butt set cannot be used as the receiver in this method. The use of the transmitter and the special receiver to verify CO wiring is not considered to be cost-effective. In some situations, several special receivers per CO may be necessary, making this solution more expensive and even less desirable.

Accordingly, there is a need for a system and method that can verify the DSL circuit in a line sharing arrangement in a cost effective manner. Specifically, there is a need for a system and method that can utilize existing conventional butt sets to verify the DSL circuit in a line sharing arrangement.

SUMMARY OF THE INVENTION

The present invention is a system and method that uses amplitude modulation to verify the DSL circuit in a shared telephone line. The system of the invention includes a transmitter and a receiver. The transmitter sends an amplitude-modulated test signal to the shared telephone line. The test signal is introduced to the telephone line on one side of a blocking capacitor that isolates a DSLAM on the DSL circuit. The test signal is a product of a high frequency carrier signal and a low frequency audible signal. The receiver is connected to the DSL circuit of the shared telephone line on the other side of the blocking capacitor to detect the test signal. The DSL circuit is verified if the test signal is detected by the receiver through the blocking capacitor.

In a preferred embodiment of the invention, a conventional butt set is used as the receiver. It is noted that most conventional butt sets have enough non-linearity to detect the signal. In instances in which newer butt sets (designed with better linearity) are employed, an external detector may be employed. The transmitter has an amplitude modulator that mixes the audible signal received from a low frequency oscillator and a carrier signal received from a high frequency oscillator. The product of the amplitude modulator is the amplitude-modulated test signal.

The carrier signal generated by the high frequency oscillator could have a frequency as low as a few tens of kHz, below which the filtering described below would be difficult. It could have a frequency as high as a few tens of MHz, above which the attenuation of the wiring and cabling through which the signal must pass might be excessive. Preferably, the carrier signal is in the range of about 25 kHz to about 1 MHz, the same range of frequencies used by ADSL. At about 100 kHz, the frequency of the carrier signal is high enough that the signal is transmitted through the blocking capacitor and low enough that the signal is not unduly attenuated by the wiring and cabling through which it must pass.

In the preferred embodiment, the audible signal generated by the low frequency oscillator preferably has a frequency at between about 300 Hz and about 3 kHz. Preferably, the audible signal is at about 1 kHz. Preferably, a gate or a switch is provisioned between the low frequency oscillator and the amplitude modulator to regulate the input of the low frequency signal to the amplitude modulator at a low rate, for example, less than about 5 Hz. For example, the gate opens at a rate of about two times per second. This rate is desirable because it produces a tone that is distinguishable by a technician during verification.

The test signal generated by the amplitude modulator is then processed by a high-pass filter to remove any residual low frequency signals before it is used to verify the DSL circuit. Preferably, the transmitter is also equipped with a low-pass filter to prevent the remaining high frequency components of the test signal from going to the outside plant or the customer side of the telephone line. This allows the customer to use the telephone line for voice communications without interruption. The test signal that goes to the CO side of the telephone line does not go through the low-pass filter in the transmitter. As a result, the high frequency test signal goes from the transmitter to the CO side of the telephone line.

Preferably, the test signal is output from the transmitter to a main distributing frame of the CO to test the telephone line. The test signal goes through the main distributing frame to a splitter having a blocking capacitor and a low-pass filter, which are connected to the DSLAM and a voice switch, respectively. Since the test signal has a high frequency carrier component, the test signal can go through the blocking capacitor to verify the DSL circuit. A receiver placed on the other side of the blocking capacitor then verifies the presence of the test signal on the DSL circuit. The low-pass filter in the splitter ensures that the test signal does not interrupt the voice circuit part of the telephone line.

DETAILED DESCRIPTION OF THE INVENTION

Figure 1:
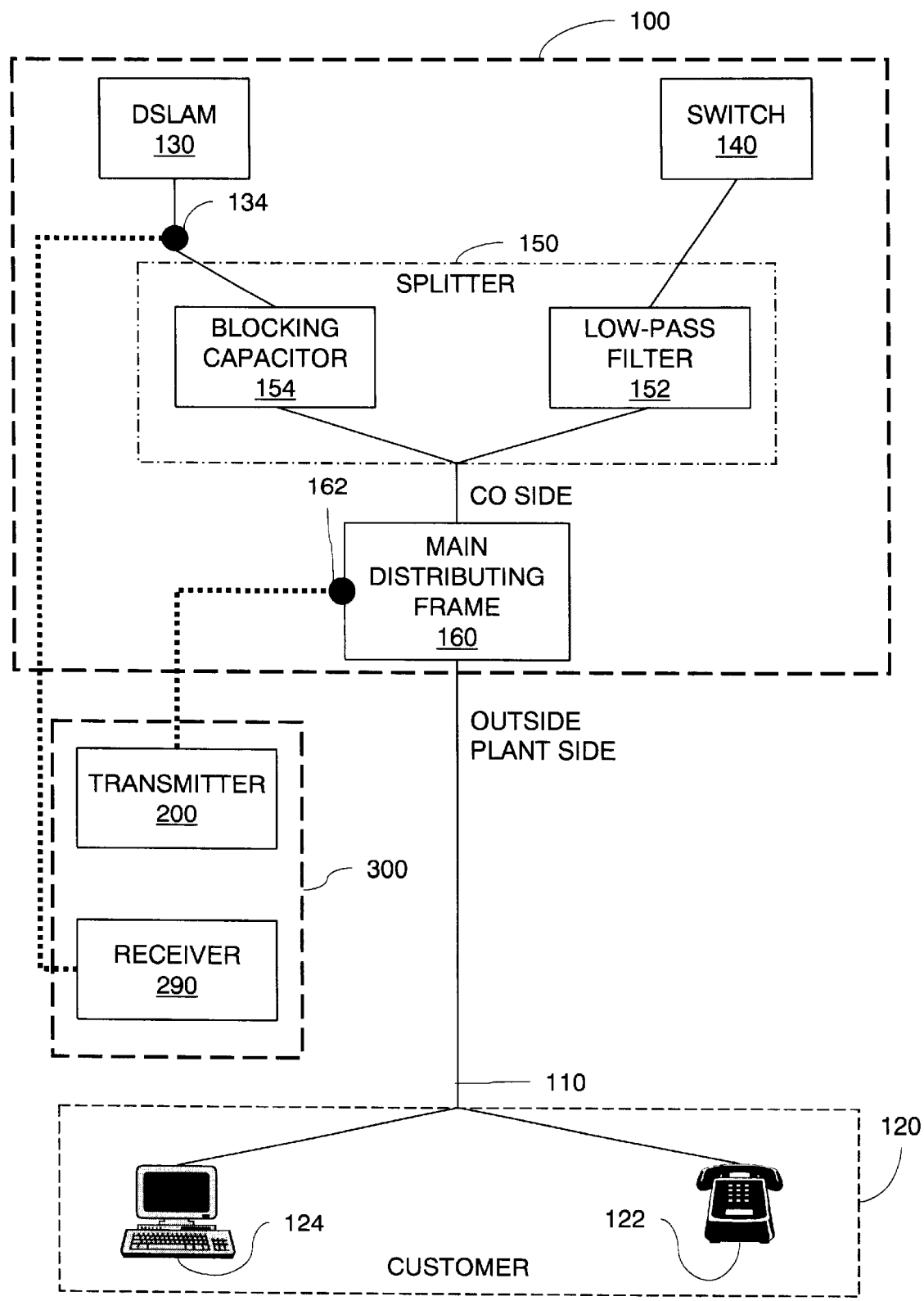
FIG. 1 is a schematic diagram of the present invention.

FIG. 1 is a schematic diagram showing a high level view of the present invention. Telephone line 110 is associated with customer 120 for voice and data communication services that are provided by an ILEC and a CLEC, respectively. Customer 120 uses CPE 122 for voice sessions and computer 124 for data sessions. Under the line sharing arrangement, the data sessions are handled by the CLEC that owns DSLAM 130, and the voice sessions are processed by the ILEC that uses switch 140. Both voice and data sessions go through main distributing frame 160 at CO 100.

The line sharing arrangement comprises splitter 150, which is connected to DSLAM 130 and switch 140 as shown in FIG. 1. Splitter 150 is provisioned on telephone line 110 to separate voice and data components of telephone line 110. The voice component is processed by the ILEC through switch 140. The data component is processed by DSLAM 130, which is owned and operated by the CLEC. As required by the industry standard, blocking capacitor 154 is required to separate DSLAM 130 so that interference created by the CLEC's DSL circuit will not affect the POTS circuit of the ILEC. Blocking capacitor 154 also makes it impossible to test the DSL circuit using conventional voice band frequencies.

As shown in FIG. 1, blocking capacitor 154 is a component of splitter 150 that separates DSLAM 130 from main distributing frame 160. In addition to blocking capacitor 154, splitter 150 has low-pass filter 152 that connects switch 140 to main distributing frame 160.

System 300 is an embodiment of the present invention, which includes transmitter 200 and receiver 290. Transmitter 200 sends a test signal to main distributing frame 160 at MDF connector 162. Receiver 290 is connected to the DSL circuit at point 134. Point 134 can be anywhere between DSLAM 130 and blocking capacitor 154. The DSL circuit of telephone line 110 is verified if receiver 290 detects the test signal transmitted by transmitter 200. In other words, the DSL circuit of telephone line 110 is complete when receiver 290 at point 134 can receive the test signal generated by transmitter 200 at MDF connector 162.

Figure 2:
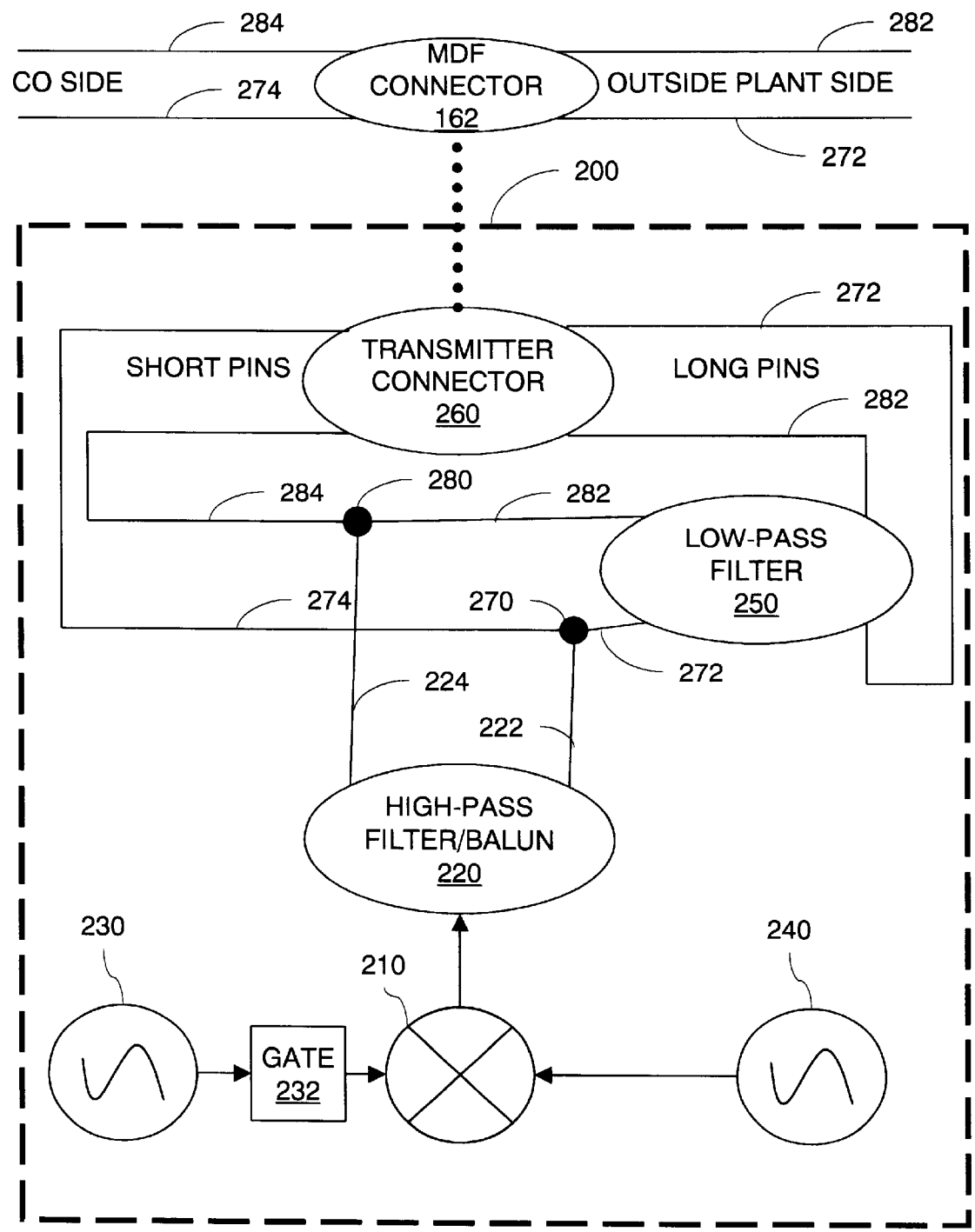
FIG. 2 is a schematic diagram showing the system architecture of an embodiment of a transmitter of the present invention.

FIG. 2 is a schematic diagram showing the system architecture of an embodiment of a transmitter of the present invention. As shown in FIG. 2, transmitter 200 includes amplitude modulator 210, high-pass filter/balun 220, low frequency oscillator 230, high frequency oscillator 240, low-pass filter 250, and transmitter connector 260. A balun is a device that converts a circuit from balanced to unbalanced (BAL UN) and vice versa. Note that the input to high-pass filter/balun 220 is unbalanced, i.e., referenced to ground, while the output of high-pass filter/balun 220 is balanced, i.e., the signal is applied across paths 222 and 224 and is not referenced to ground.

Amplitude modulator 210 receives an audible signal (the interfering signal) from low frequency oscillator 230 and a carrier signal from high frequency oscillator 240 to produce an amplitude-modulated test signal. The low frequency signal can be at a frequency between about 300 Hz and about 3 kHz. Preferably, the low frequency audible signal is at about 1 kHz. The audible signal is preferably regulated by gate 232. Preferably, gate 232 opens at a rate of about two times per second. This rate enables a field technician to hear the audible signal through receiver 290 at point 134 (see FIG. 1).

The carrier signal generated by high frequency oscillator 240 can be at a frequency as low as a few tens of kHz, below which the filtering described below would be difficult. The carrier signal could have a frequency as high as a few tens of MHz, above which the attenuation of the wiring and cabling through which the signal must pass might be excessive. Preferably, the carrier signal is in the range of about 25 kHz to about 1 MHz, the same range of frequencies used by ADSL. At about 100 kHz, the frequency of the carrier signal is high enough that the signal is transmitted through the blocking capacitor and low enough that the signal is not unduly attenuated by the wiring and cabling through which it must pass. The 100 kHz frequency has been tested to couple through blocking capacitor 154 in splitter 150 (see FIG. 1).

The amplitude-modulated test signal output by amplitude modulator 210 is processed by high-pass filter/balun 220. High-pass filter/balun 220 removes any residual low frequency signal that is output by amplitude modulator 210.

Transmitter connector 260 is, for example, a five-pin connector that is adapted to mate with MDF connector 162 at main distributing frame 160 (see FIG. 1). Preferably, a test signal coming out of high-pass filter/balun 220 on paths 222 and 224 is balanced and is sent to the CO side of the telephone line through the short pins of transmitter connector 260 (see paths 274 and 284). Preferably, the test signal coming out of high-pass filter/balun 220 on paths 222 and 224 is split at nodes 270 and 280, respectively, so that the test signal can be further blocked by low-pass filter 250 before it is sent to the outside plant side of the telephone line through the long pins of transmitter connector 260 (see paths 272 and 282).

Referring to FIG. 1, splitter 150 has low-pass filter 152 that prevents the high-frequency test signal from being coupled into the voiceband switch 140, thus preventing unwanted IMD from occurring in switch 140. Similarly, low-pass filter 250 in transmitter 200 prevents the IMD in CPE 122. Thus, the present invention permits the use of high frequency test signal to verify the DSL circuit without interrupting the voice circuit.

An exemplary implementation of the transmitter of the present invention has the following characteristics.

1: The transmitter is a hand-held unit powered by one or more 9-volt batteries.

2: The transmitter is connected at the main distributing frame of a CO so that low-pass filtering that is needed to prevent the creation of voiceband noise via the IMD in the CPE can be employed.

3: The transmitter has a five-pin plug or connector that is capable of being inserted into a conventional five-pin protector jack at the main distributing frame. For older style frames, alligator clips can be provided.

4: The transmitter is capable of supporting itself by the connecting cord, such that it will not pull out the five-pin plug.

5: The case of the transmitter is made of a non-metallic material. Non-metallic materials are used so that the transmitter does not "short" or otherwise interfere with other subscriber lines on the MDF.

6: A non-metallic strap is provided to support the case of the transmitter. Non-metallic materials are used so that the transmitter does not "short" or otherwise interfere with other subscriber lines on the MDF.

7. The test signal generated by the transmitter does not affect voice communication sessions of the telephone line.

8: While inserted into the five-pin plug, the transmitter completes the circuit between the outside plant and CO connections on the main distributing frame. A low-pass filter is required at the transmitter to isolate CPE from the high-frequency tone.

9: The direct current resistance between the outside plant side and the CO side (see FIG. 2) does not exceed 100 Ohms, measured at any level of current less than 100 mA. Compliance may be demonstrated by shorting the outside plant side and measuring the direct current resistance of the CO side.

10: The insertion loss of the transmitter (measured between the CO side and the outside plant side, between a 600 Ω source and load, and measured at 1004 Hz) does not exceed 1.5 dB.

11: The insertion loss of the transmitter (measured between the CO side and the outside plant side, between a 600 Ω source and load, and measured at 4004 Hz) does not exceed the insertion loss measured at 1004 Hz by more than 3.0 dB.

12: To be non-intrusive, the test signal transmitted toward the CLEC equipment is well out of the voiceband, but yet capable of being heard via detection, e.g., through non-linearities in a technician's butt set. It has been verified that a conventional butt set, when in the speaker-phone mode, can de-modulate the amplitude modulated 100 kHz carrier test signal. A nominal +9 dBm carrier modulated at about 80% produces a tone that is clearly audible even in a switchroom.

13: The transmitter transmits a signal consisting of a 100 kHz carrier amplitude modulated with an interrupted 1 kHz tone. The level of the carrier is +9 dBm, +/−1 dB, measured into 135 Ohms on the CO side. The modulation index is between 60 and 90%.

14: The transmitter does not introduce any significant level of noise into the voiceband itself (except, of course, when the butt set is connected).

15: The noise introduced into the voiceband does not exceed 20 dBrnC, measured into 900 Ohms, measured on either the CO side or the outside plant side.

16: The total wideband noise, measured across the outside plant side, does not exceed −60 dBm.

17: The above requirements are met with any level of direct current voltage between 0 and 105 V, applied across tip and ring on either the CO side or outside plant side.

18: The transmitter must not be damaged by the application of 20 Hz ringing, at 88 Vrms, superimposed on 55 Vdc, applied across tip and ring on either the CO side or the outside plant side.

19: When connected, the transmitter may be exposed to hazardous voltages, e.g., lightning, via the outside plant.

The transmitter is capable of working in the presence of up to 50 Vrms of induced-longitudinal voltage.

The transmitter exhibits at least 55 dB of longitudinal balance, measured using the IEEE method, at any frequency between 60 Hz and 4 kHz.

The transmitter is equipped with normal over-voltage protection.

20: The transmitter should not provide a false "trouble" indication to a loop test system.

The direct current resistance, between any combination of tip, ring, and ground, shall exceed 3.5 MΩ.

The capacitance to ground, from either tip or ring, does not exceed 1.0 nF.

Figure 3:
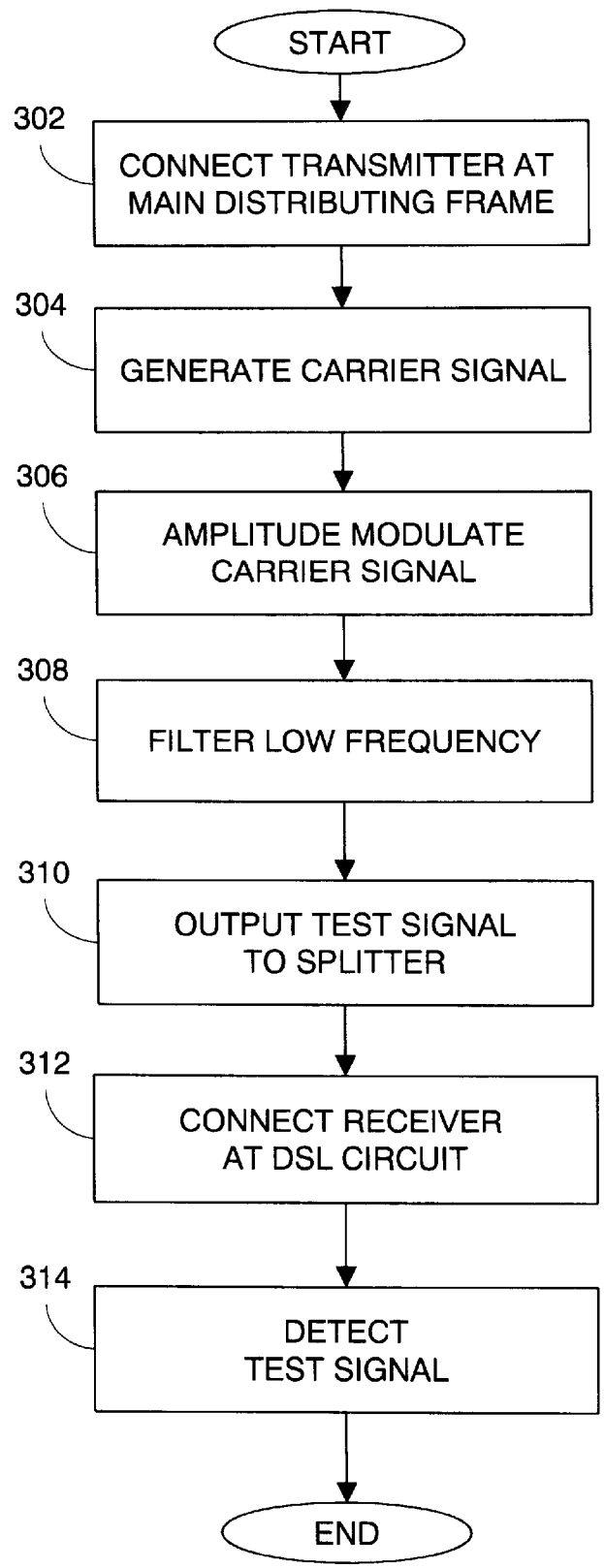
FIG. 3 is a flowchart showing exemplary steps used to practice an embodiment of the present invention.

FIG. 3 is a flowchart showing exemplary steps involved in using an embodiment of the present invention.

In step 302, a transmitter of the present invention is connected to a main distributing frame at which a shared telephone line is present.

In step 304, a high frequency oscillator generates a carrier signal.

In step 306, an amplitude modulator of the transmitter mixes the high frequency carrier signal with a low frequency audible signal to produce an amplitude-modulated test signal.

In step 308, any residual low-frequency signal output by of the amplitude modulator is removed by a high-pass filter in the transmitter.

In step 310, the amplitude-modulated test signal is sent to a splitter at the CO side of the telephone line via the main distributing frame.

In step 312, a receiver of the present invention is connected to the DSL circuit on the other side of the splitter which is isolated by a blocking capacitor.

In step 314, the DSL circuit is verified if the receiver detects the test signal.

Figure 4:
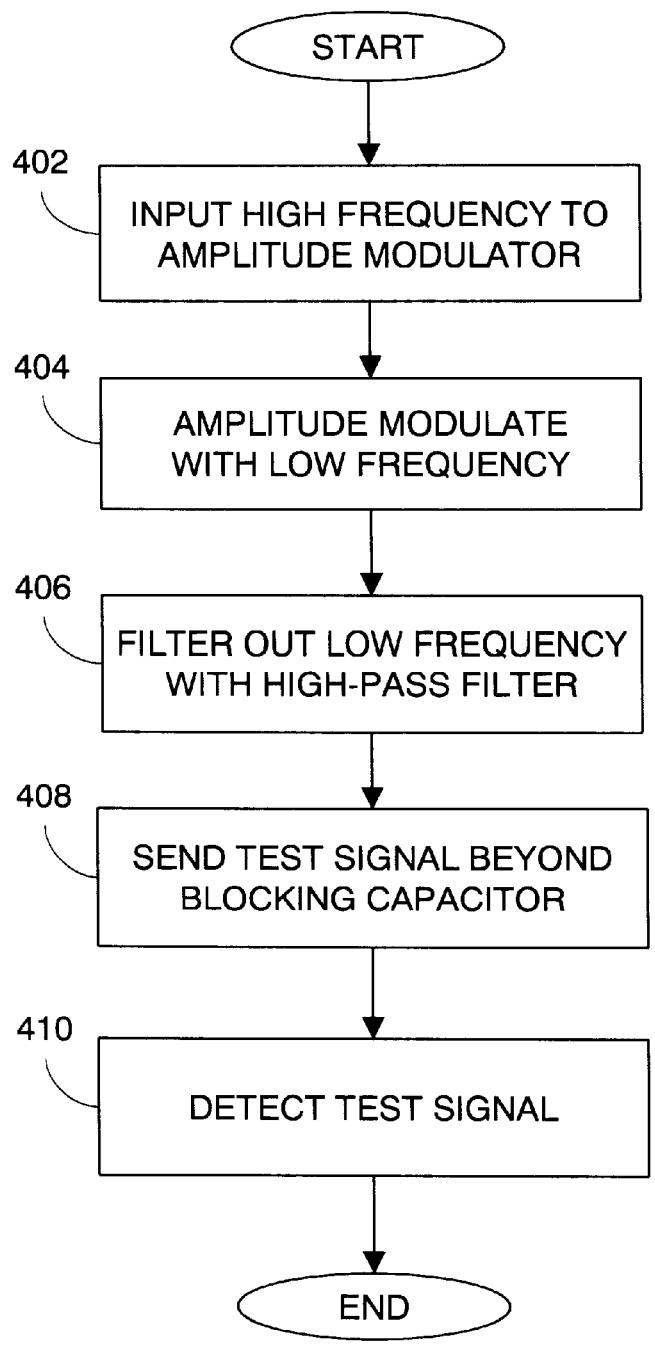
FIG. 4 is a flowchart showing exemplary steps used in implementing an embodiment of the present invention.

FIG. 4 is a flowchart showing exemplary steps involved in implementing an embodiment of the present invention.

In step 402, a high frequency signal is introduced to an amplitude modulator by a high frequency oscillator. The high frequency signal preferably has a frequency between about 10 kHz and about 10 MHz.

In step 404, the amplitude modulator mixes the high frequency signal with a low frequency signal. The high frequency signal is amplitude modulated as the carrier signal to carry the audible low frequency signal. The low frequency signal is introduced to the amplitude modulator by a low frequency oscillator. The low frequency signal is in the voice band which is audible by a human. The low frequency signal preferably has a frequency between about 300 Hz and about 3 kHz.

In step 406, any residual low frequency signal output by the amplitude modulator is removed by a high-pass filter.

In step 408, the amplitude-modulated test signal is introduced to the telephone line at the main distributing frame side of the blocking capacitor.

In step 410, a receiver of the invention is used to detect the test signal at the DSLAM side of the blocking capacitor.

It is noted that the transmitter could be connected to the MDF via an automated means of interconnection, so as to minimize the labor required to locate the line to be tested and connect the instrument. Alternatively, this invention could also be implemented by permanently incorporating the transmitter in the splitter or in the DSLAM. In either arrangement an automated mechanism (for connecting the transmitter to the circuit to be tested) could be employed so as minimize the number of transmitters required. In this implementation, the low pass filter (shown as item 250 in FIG. 2) would need to be removed so as to allow the high-frequency signal to be transmitted toward the MDF.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A transmitter for verifying connectivity of a shared telephone line comprising:

a high frequency oscillator for generating a carrier signal;

a low frequency oscillator for generating an audible signal;

an amplitude modulator in communication with each of the high frequency oscillator and the low frequency oscillator, wherein the amplitude modulator mixes the carrier signal and the audible signal to produce an amplitude-modulated test signal;

a gate in communication with the low frequency oscillator and the amplitude modulator, wherein the gate regulates the flow of the audible signal from the low frequency oscillator to the amplitude modulator;

a high-pass filter in communication with the amplitude modulator, wherein the high-pass filter receives the amplitude-modulated test signal and removes any residual low frequency signal output by the amplitude modulator; and a connector in communication with the high-pass filter, wherein the connector is adapted to send the amplitude-modulated test signal to a central office side of the telephone line.

2. The transmitter of claim 1, further comprising a low-pass filter in communication with and located in between the high-pass filter and the connector, wherein the low-pass filter prevents the amplitude-modulated test signal from going to an outside plant side of the telephone line.

3. The transmitter of claim 1, wherein the gate opens at a low rate.

4. The transmitter of claim 1, wherein the audible signal has a frequency in a range between about 300 Hz and about 3 kHz.

5. The transmitter of claim 1, wherein the audible signal has a frequency of about 1 kHz.

6. The transmitter of claim 1, wherein the carrier signal has a frequency that is not audible by a human.

7. The transmitter of claim 1, further comprises a balun coupled with the high-pass filter.

8. The transmitter of claim 1, wherein the carrier signal has a frequency that is detectable by a conventional butt set.

9. The transmitter of claim 1, wherein the carrier signal has a frequency of about 25 kHz to about 1 MHz.

10. A method for verifying a DSL circuit on a shared telephone line having a blocking capacitor that separates a DSLAM from a main distributing frame, the method comprising:

mixing a low frequency audible signal and a high frequency carrier signal to produce an amplitude-modulated test signal;

regulating the audible signal;

inputting the amplitude-modulated test signal to the shared telephone line at the main distributing frame side of the blocking capacitor; and detecting the amplitude-modulated test signal at the DSLAM side of the blocking capacitor.

11. The method of claim 10, further comprising the step of removing any residual low frequency signal output by of the amplitude modulator.

12. The method of claim 10, further comprising the step of preventing the amplitude-modulated test signal from going to an outside plant side of the telephone line.

13. The method of claim 10, wherein the regulating step is performed by using a gate that opens at a low rate.

14. The method of claim 10, wherein the audible signal has a frequency in a range between about 300 Hz and about 3 kHz.

15. The method of claim 10, wherein the audible signal has a frequency of about 1 kHz.

16. The method of claim 10, further comprising the step of balancing the amplitude-modulated test signal.

17. The method of claim 10, wherein the carrier signal has a frequency of about 25 kHz to about 1 MHz.

18. The method of claim 10, wherein the detecting step is performed by using a conventional butt set.

19. A system for verifying connectivity of a telephone line having a blocking capacitor that separates a DSLAM from a main distributing frame comprising:

a transmitter for sending an amplitude-modulated test signal to the telephone line on a main distributing frame side of the blocking capacitor, wherein the transmitter comprises an amplitude modulator that produces the amplitude-modulated test signal characterized by a low frequency audible signal and a high frequency carrier signal, wherein the low frequency audible signal is regulated;

a high-pass filter in communication with the amplitude modulator, wherein the high-pass filter removes any residual low frequency signal output by the amplitude modulator; and a connector in communication with the high-pass filter, wherein the connector is adapted to send the amplitude-modulated test signal to the main distributing frame; and a receiver adapted to detect the amplitude-modulated test signal at a DSLAM side of the blocking capacitor.

20. The system of claim 19, wherein the transmitter further comprising a low-pass filter in communication with and located in between the high-pass filter and the connector, wherein the low-pass filter prevents the amplitude-modulated test signal from going to an outside plant side of the telephone line.

21. The system of claim 19, wherein the audible signal has a frequency in a range between about 300 Hz and about 3 kHz.

22. The system of claim 19, wherein the carrier signal has a frequency that is not audible by a human.

23. The system of claim 19, further comprising a balun coupled with the high-pass filter.

24. The system of claim 19, wherein the carrier signal has a frequency that is detectable by a conventional butt set.

25. The system of claim 19, wherein the carrier signal has a frequency of about 25 kHz to about 1 MHz.

26. The system of claim 25, wherein the carrier signal has a frequency of about 100 kHz.

* * * * *